(12) United States Patent
Talebi Fard et al.

(10) Patent No.: US 11,765,631 B2
(45) Date of Patent: *Sep. 19, 2023

(54) EXTENDED BUFFERING DETERMINATION BY A SESSION MANAGEMENT FUNCTION

(71) Applicant: Honor Device Co., Ltd., Guangdong (CN)

(72) Inventors: Peyman Talebi Fard, Sterling, VA (US); Esmael Hejazi Dinan, McLean, VA (US); Kyungmin Park, Vienna, VA (US); Weihua Qiao, Herndon, VA (US)

(73) Assignee: HONOR DEVICE CO., LTD., Shenzhen (CN)

( * ) Notice: Subject to any disclaimer, the term of this patent is extended or adjusted under 35 U.S.C. 154(b) by 260 days.

This patent is subject to a terminal disclaimer.

(21) Appl. No.: 17/208,190

(22) Filed: Mar. 22, 2021

(65) Prior Publication Data

US 2021/0211955 A1 Jul. 8, 2021

Related U.S. Application Data

(63) Continuation of application No. 16/196,613, filed on Nov. 20, 2018, now Pat. No. 10,959,142.

(Continued)

(51) Int. Cl.
*H04W 36/02* (2009.01)
*H04W 8/08* (2009.01)
(Continued)

(52) U.S. Cl.
CPC ............ *H04W 36/02* (2013.01); *H04W 8/08* (2013.01); *H04W 12/06* (2013.01); *H04W 60/06* (2013.01); *H04W 76/28* (2018.02)

(58) Field of Classification Search
CPC ....... H04W 36/02; H04W 76/28; H04W 8/08; H04W 12/06; H04W 60/06; H04W 72/02;
(Continued)

(56) References Cited

U.S. PATENT DOCUMENTS

| 2019/0021069 A1* | 1/2019 | Chun | H04W 4/70 |
| 2019/0166647 A1* | 5/2019 | Velev | H04W 76/11 |
| 2019/0200264 A1* | 6/2019 | Kim | H04W 76/22 |

OTHER PUBLICATIONS

3GPP TS 23.214 V15.0.0 (Sep. 2017); Technical Specification; 3rd Generation Partnership Project; Technical Specification Group Services and System Aspects; Architecture enhancements for control and user plane separation of EPC nodes; Stage 2; (Release 15).

(Continued)

*Primary Examiner* — Hardikkumar D Patel
(74) *Attorney, Agent, or Firm* — Conley Rose, P.C.

(57) ABSTRACT

A session management function (SMF) sends, to an access and mobility management function (AMF), a first message for user plane activation of a wireless device. The first message comprises an identifier of a packet data unit session of the wireless device. A second message is received from the AMF and in response to the wireless device being unreachable. The second message is used to determine an extended buffering time. A third message is sent to a user plane function (UPF). The third message comprises the extended buffering time and indicates buffer downlink data of the wireless device.

20 Claims, 15 Drawing Sheets

Related U.S. Application Data

(60) Provisional application No. 62/588,766, filed on Nov. 20, 2017.

(51) Int. Cl.
*H04W 76/28* (2018.01)
*H04W 12/06* (2021.01)
*H04W 60/06* (2009.01)

(58) Field of Classification Search
CPC ..... H04W 24/10; H04W 48/18; H04W 76/25; H04W 80/10; H04W 72/048; H04W 76/11; H04W 76/12; H04W 76/27; H04W 76/38; H04W 76/00; H04W 68/02; H04W 36/00; H04W 76/10; H04W 4/70; H04W 68/00; H04W 36/0022; H04W 76/20; H04L 5/00; H04L 5/0098
See application file for complete search history.

(56) References Cited

OTHER PUBLICATIONS

3GPP TS 23.401 V15.1.0 (Sep. 2017); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).
3GPP TS 23.501 V1.5.0 (Nov. 2017); Technical Specification; 3rd Generation Partnership Project; Technical Specification Group Services and System Aspects; System Architecture for the 5G System; Stage 2 (Release 15).
3GPP TS 23.502 V1.3.0 (Nov. 2017); Technical Specification; 3rd Generation Partnership Project; Technical Specification Group Services and System Aspects; Procedures for the 5G System; Stage 2 (Release 15).
3GPP TS 23.682 V15.2.0 (Sep. 2017); Technical Specification; 3rd Generation Partnership Project; Technical Specification Group Services and System Aspects; Architecture enhancements to facilitate communications with packet data networks and applications (Release 15).
S2-174826; (Revision of S2-174382); 3GPP TSG-SA WG2 Meeting #122; San Jose Del Cabo, Mexico Jun. 26-30, 2017.
S2-176988; SA WG2 Meeting #123; Oct. 23-27, 2017, Ljubljana, Slovenia (was S2-17xxxx); Source: Ericsson (Rapporteur); Title: Editorial corrections and alignment; Document for: Approval; Agenda Item: 6.5.1.
S2-176993; SA WG2 Meeting #123; Oct. 23-27, 2017, Ljubljana, SI (revision of S2-17xxxx); Source: Ericsson Title: Network Triggered Service Request improvement; Document for: Approval.
S2-177074; SAWG2 Meeting #123; Oct. 23-27, 2017, Ljubljana, Slovenia; Source: Huawei, Hisilicon Title: Addressing EN in service request procedure on handling UE moving out of area of interest—OI#15.
S2-177089; SA WG2 Meeting #123; Oct. 23-27, 2017, Ljubljana, Slovenia (was S2-17xxxx); Source: ZTE Title: TS 23.502: Trigger a UE via non-3GPP access for re-activating PDU sessions in 3GPP access Document for: Discussion/Approval.
S2-177119; (was S2-17xxxx); SA WG2 Meeting #123; Oct. 23-27, 2017, Ljubljana, Slovenia; Source: NEC Title: TS 23.502: Clean-up Network triggered Service Request procedure; Document for: Approval; Agenda Item 6.5.74.
S2-177142; (revision of S2-17xxxx); SA WG2 Meeting #123; Oct. 23-27, 2017, Ljubljana, Slovenia; Source: LG Electronics; Title: TS 23.502: Clarification User Plane Re-activation timer in NW triggered SR Document for: Approval.
S2-177203; 3GPP TSG-SA WG2 Meeting #123; Ljubljana, Slovenia, Oct. 23-27; Title: Introduction of Ethernet PDN connection type in EPC; Source to WG: Qualcomm Incorporated.
S2-177344; SAWG2 Meeting #123; Oct. 23-27, 2017, Ljubljana, Slovenia (revision of S2-17xxxx); Source: Samsung, SK Telecom; Title: TS 23.502: NAS notification to initiate a Service Request procedure Document for: Approval.
S2-177353; (revision of S2-17xxxx); SA WG2 Meeting #123; Oct. 23-27, 2017, Ljubljana, Slovenia (revision of S2-17xxxx); Source: LG Electronics; Title: TS 23.502: NW Service Request triggered by signalling messages Document for: Approval.
S2-177356; (revision of S2-17xxxx); SA WG2 Meeting #123; Oct. 23-27, 2017, Ljubljana, Slovenia; Source: LG Electronics; Title: TS 23.502: Service operation between AMF and SMF (N11 messages) during NW triggered Service Request procedure.
S2-177357; SA WG2 Meeting #123; Oct. 23-27, 2017, Ljubljana, Slovenia (was S2-17—); Source: CATT Title: Complete paging priority handling in SR procedure; Document for: Approval.
S2-177361; SAWG2 Meeting #123; Oct. 23-27, 2017, Ljubljana, Slovenia (was S2-17—); Source: CATT; Title: Cleanup on extended buffering; Document for: Approval.
S2-177377; SA WG2 Meeting #123; Oct. 11-15, 2017, Ljubljana; Source: Huawei, HiSilicon; Title: TS 23.502: Cleanup to SR procedures; Document for: Approval.
S2-177391; SAWG2 Meeting #123; Jun. 26-30, 2017 Ljubljana, Slovenia (revision of S2-17xxxx); Source: ETRI; Title: TS 23.502 NW Triggered service request for N3GPP PDU session over 3GPP access.
S2- 177400; SA WG2 Meeting #123; Jun. 26-30, 2017 Ljubljana, Slovenia (revision of S2-17xxxx); Source: ETRI Title: TS 23.502 Small update on network initiated service request procedure; Document for: Approval.
S2- 177409; SA WG2 Meeting #123; Oct. 23-27, 2017, Ljubljana, Slovenia; Source: ETRI Title: TS 23.502: Updating Network triggered Service Request procedure to consider LADN service.
S2-177432; SA WG2 Meeting #S2-123; Oct. 23-27, 2017, Ljubljana, Slovenia (was S2-17xxxx) Source: Samsung; Title: TS 23.501: PDU session reachability management.
S2-177462; SA WG2 Meeting #123; Oct. 23-27, 2017, Ljubljana, Slovenia (revision of S2-17xxxx); Source: Huawei, HiSilicon; Title: Update on the activation of UP connection; Document for: Approval.
S2-177520; SAWG2 Meeting #123; Oct. 23-27, 2017, Ljubljana, Slovania; (Revision of S2-17Xxxx); Source: Huawei, HiSilicon; Title: OI#24: TS 23.502: Optimization of paging on N3GPP access.
S2-177522; Paging Priority considering RRC-inactive; SA WG2 Meeting #123; Oct. 23-27, 2017, Ljubljana, Slovania(Revision of S2-17xxxx); ; Source:Huawei, HiSilicon; Title:TS 23.502: Paging Priority considering RRC-Inactive; Document for:Approval.
S2-177565-PCR-OI#18 23501_Interaction between SMF and UPF_ r3.7; SA WG2 Meeting #123S2-177565 Oct. 23-27, 2017, Ljubljana, Slovenia(revision of S2-17xxxx); Source:Huawei, HiSilicon; Title:OI#18 TS 23.501: Interaction between SMF and UPF on N4 Reference Point; Document for:Discussion and Approval; Agenda Item:6.5.3.
S2-177971 was7567_PCR 23.501 Extended Buffering draft v 07; SA WG2 Meeting #123S2-177971 Oct. 23-27, 2017, Ljubljana, Slovenia(Revision of S2-177567); ; Source:Huawei, HiSilicon; Title:TS 23.501: Update User Plane Management Procedures with Buffer Management ; Document for:Approval.
S2-178097 was7868 PCR-OI#18 23501_Interaction between SMF and UPF_r4.1; SA WG2 Meeting #12332-178097 Oct. 23-27, 2017, Ljubljana, Slovenia(revision of S2-177868); Source:Huawei, HiSilicon, Samsung, SK Telecom; Title:OI#18 TS 23.501: Interaction between SMF and UPF on N4 Reference Point; Document for:Discussion and Approval; Agenda Item:6.5.3.

* cited by examiner

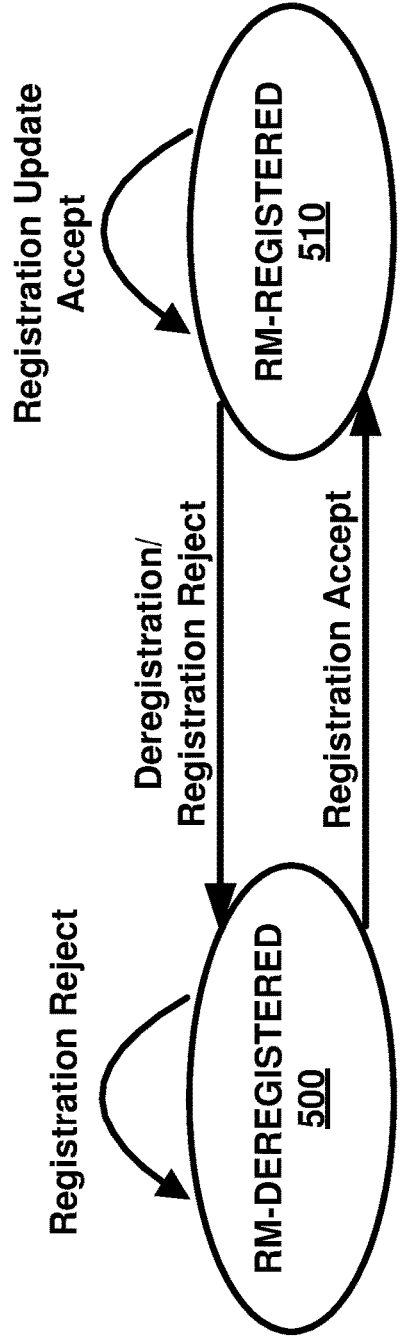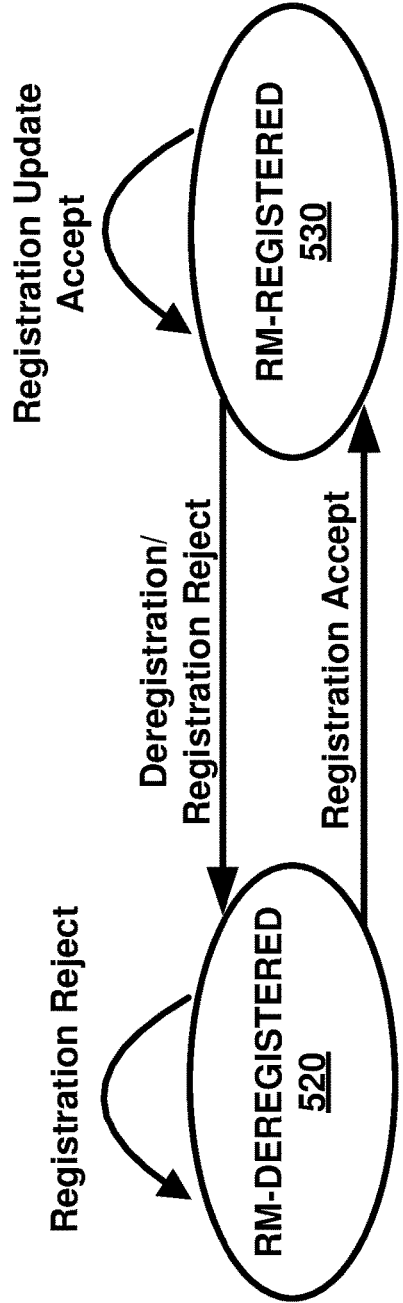
FIG. 5A
FIG. 5B

EXTENDED BUFFERING DETERMINATION BY A SESSION MANAGEMENT FUNCTION

CROSS-REFERENCE TO RELATED APPLICATIONS

This application is a continuation of U.S. patent application Ser. No. 16/196,613, filed Nov. 20, 2018, which claims the benefit of U.S. Provisional Application No. 62/588,766, filed Nov. 20, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depicts two registration management state models in UE 100 and AMF 155 as per an aspect of an example embodiment of the disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
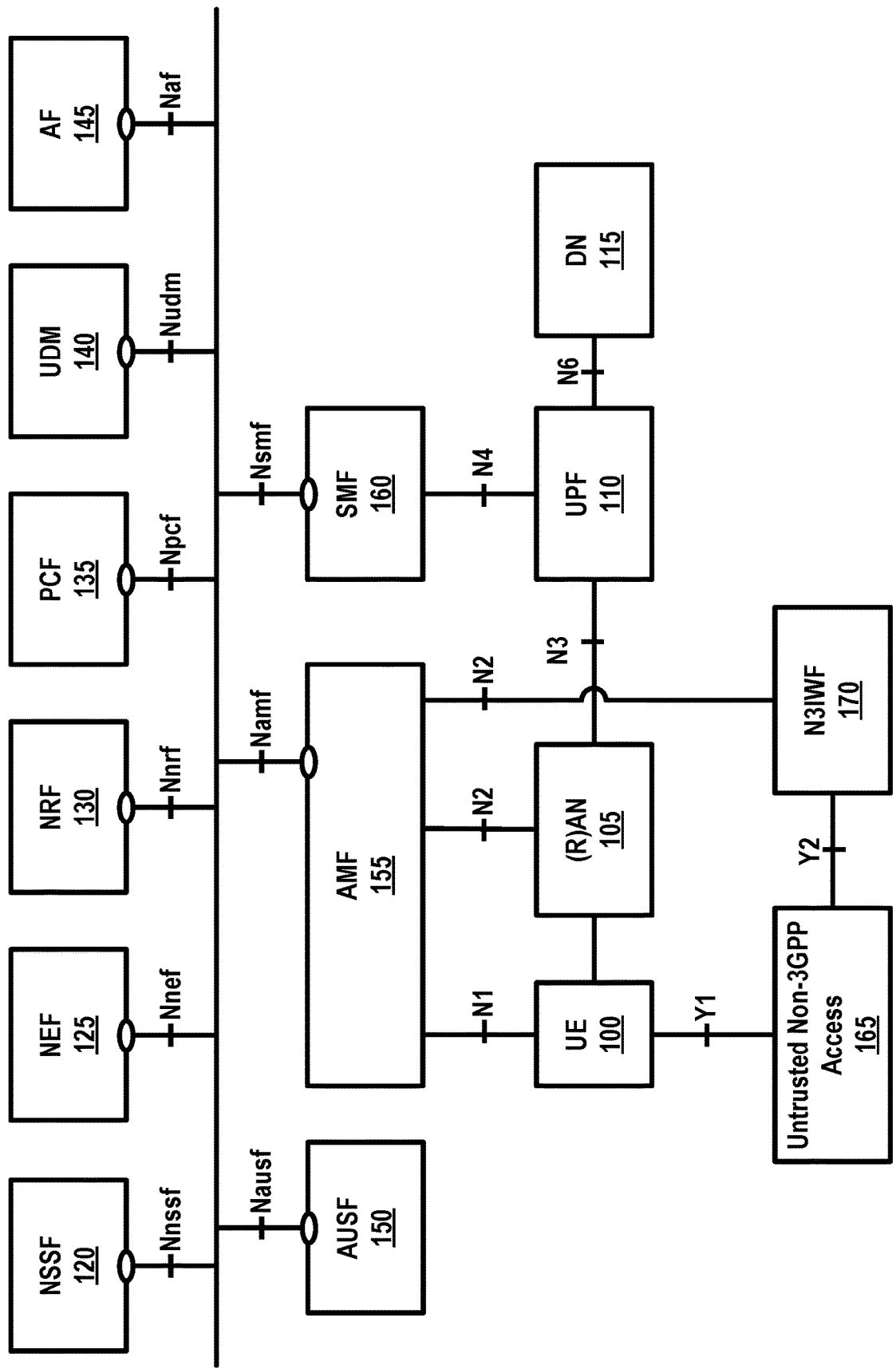
FIG. 1 is a diagram of an example 5G system architecture as per an aspect of an embodiment of the disclosure.
Figure 2:
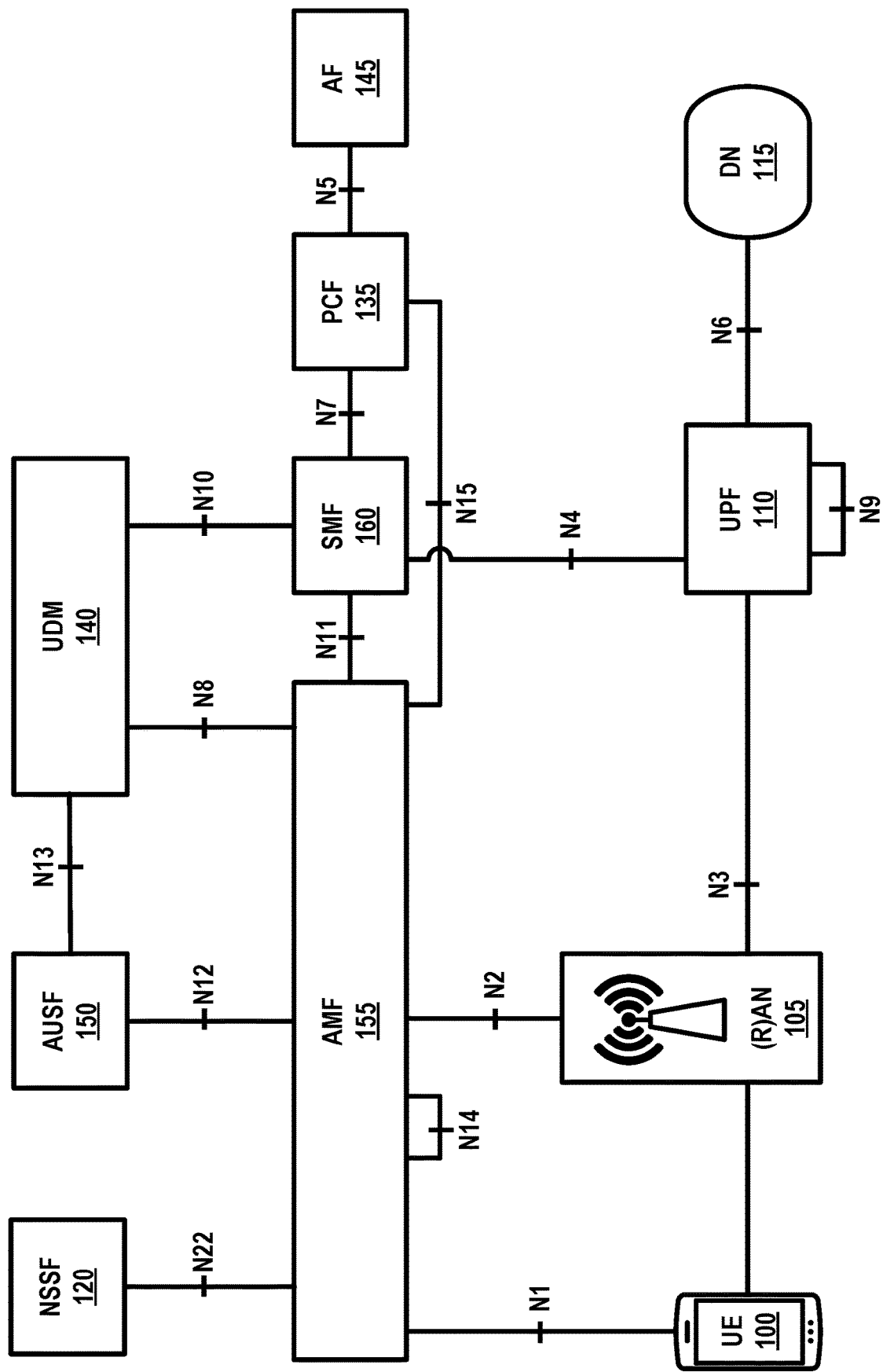
FIG. 2 is a diagram of an example 5G System architecture as per an aspect of an embodiment of the disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GTP GPRS Tunneling Protocol
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUPI Subscriber Permanent Identifier
TEID Tunnel Endpoint Identifier
UE User Equipment
UL Uplink
UL CL Uplink Classifier
UPF 110 User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
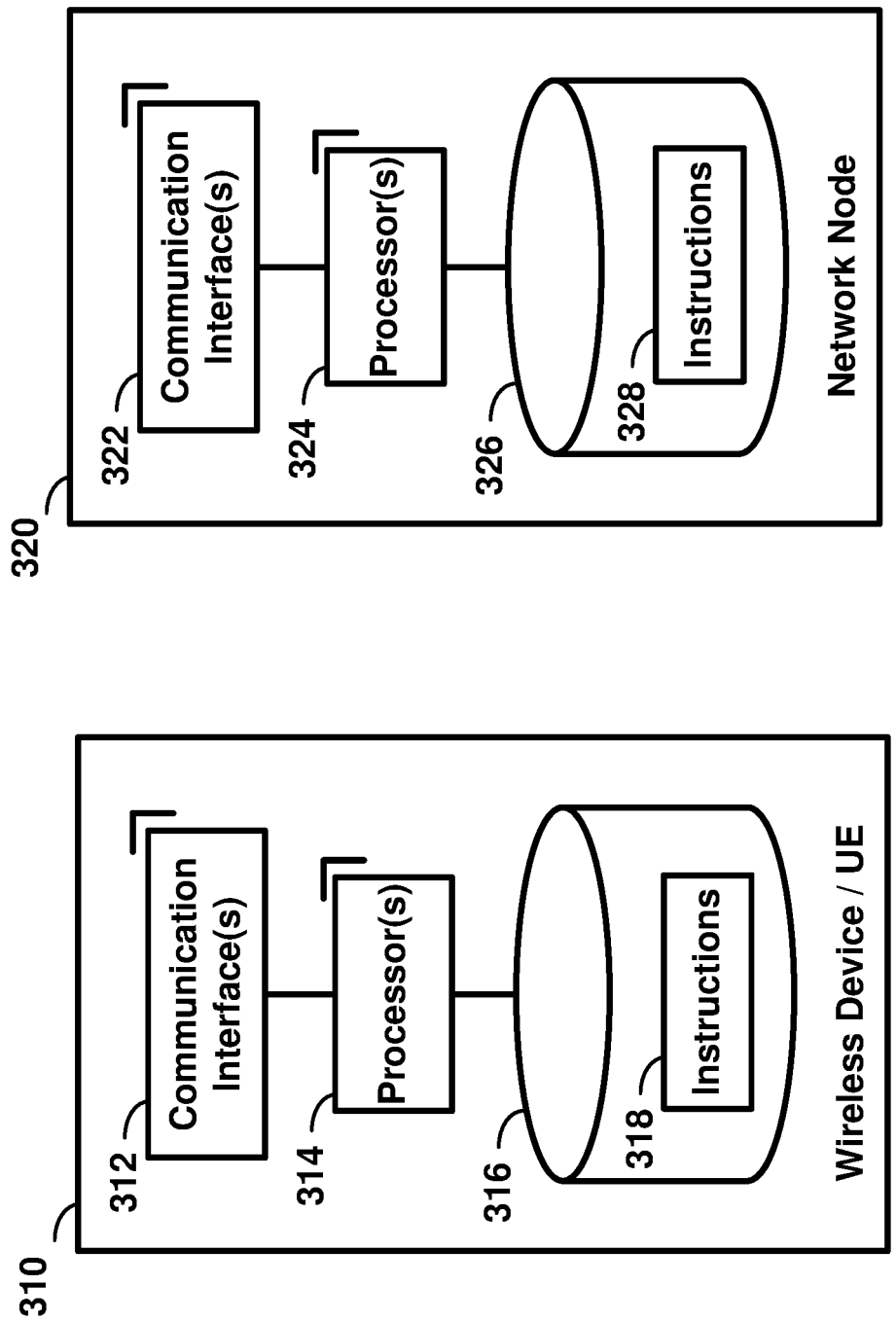
FIG. 3 is a system diagram of an example wireless device and a network node in a 5G system as per an aspect of an embodiment of the disclosure.
Figure 4:
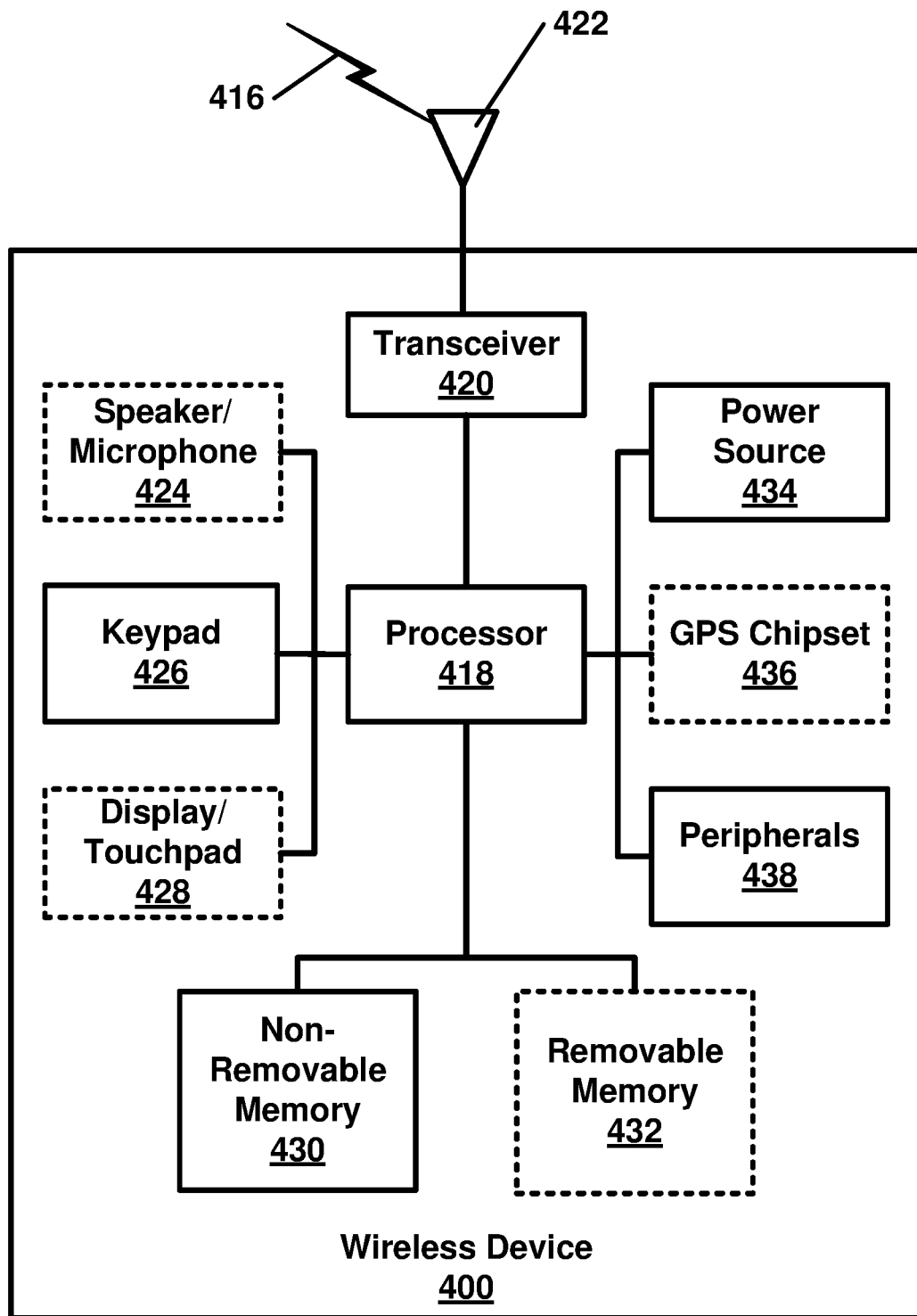
FIG. 4 is a system diagram of an example wireless device as per an aspect of an embodiment of the disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may also provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may also be employed once PDU session is established. IPv6 prefix allocation may be supported via IPv6 stateless autoconfiguration, if IPv6 is supported. IPv6 parameter configuration via stateless DHCPv6 may also be supported.

The 5GC may support the allocation of a static IPv4 address and/or a static IPv6 prefix based on subscription information in the UDM 140 or based on the configuration on a per-subscriber, per-DNN basis.

User plane function(s) (UPF 110(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network. Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
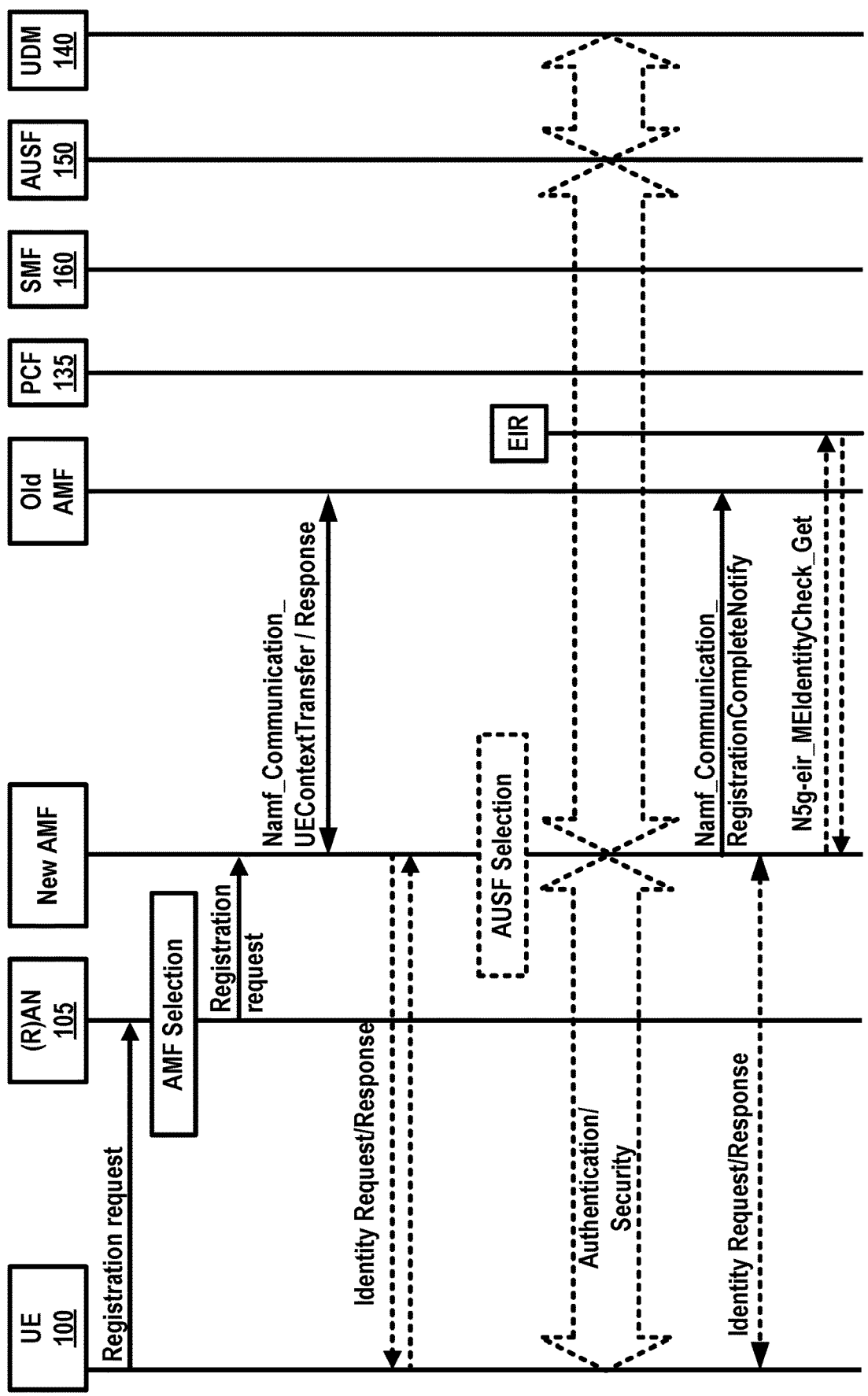
FIG. 8 is an example call flow as per an aspect of an embodiment of the disclosure.
Figure 9:
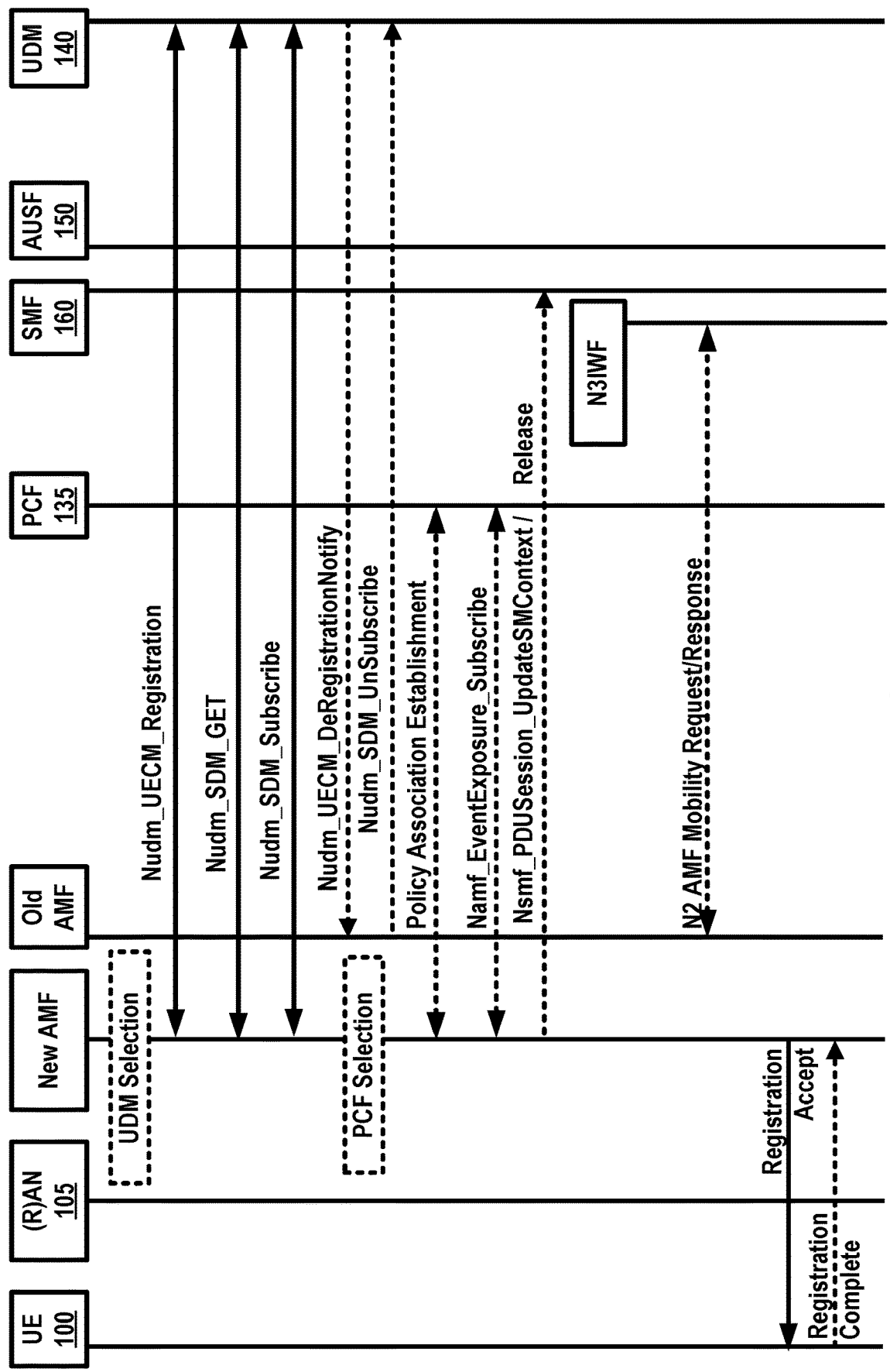
FIG. 9 is an example call flow as per an aspect of an embodiment of the disclosure.

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

An example FIG. 5A and FIG. 5B depict the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6A:
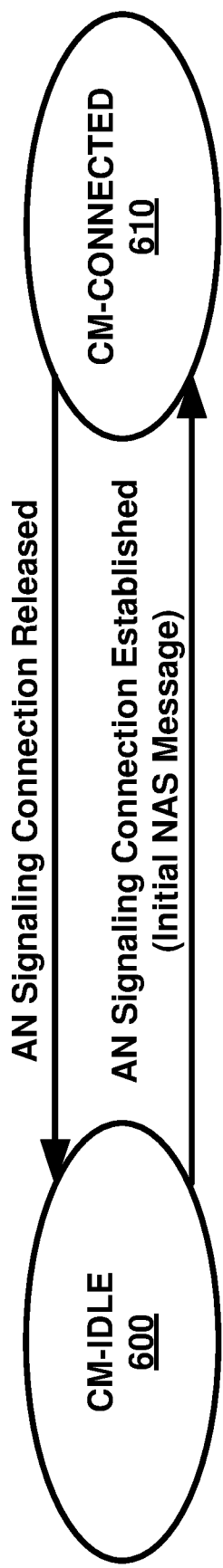
FIG. 6A and FIG. 6B depicts two connection management state models in UE 100 and AMF 155 as per an aspect of an example embodiment of the disclosure.
Figure 6B:
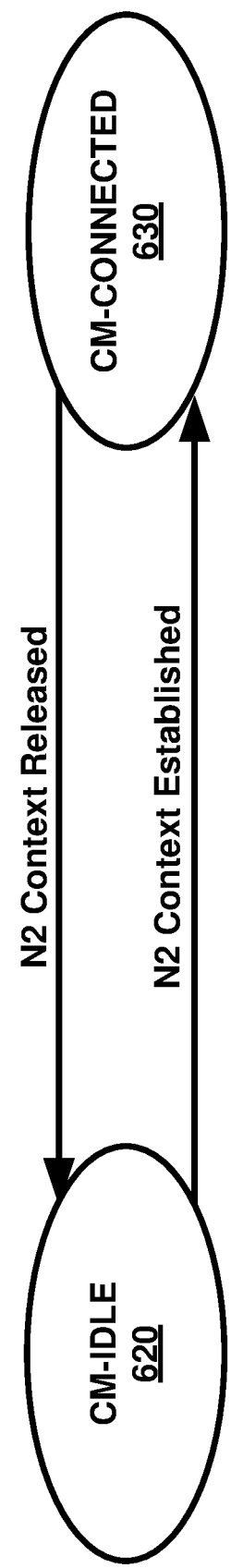

As shown in example FIG. 6A and FIG. 6B, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish the NAS signaling connection for a UE 100 in CM-IDLE 600 state. The procedure of releasing the NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
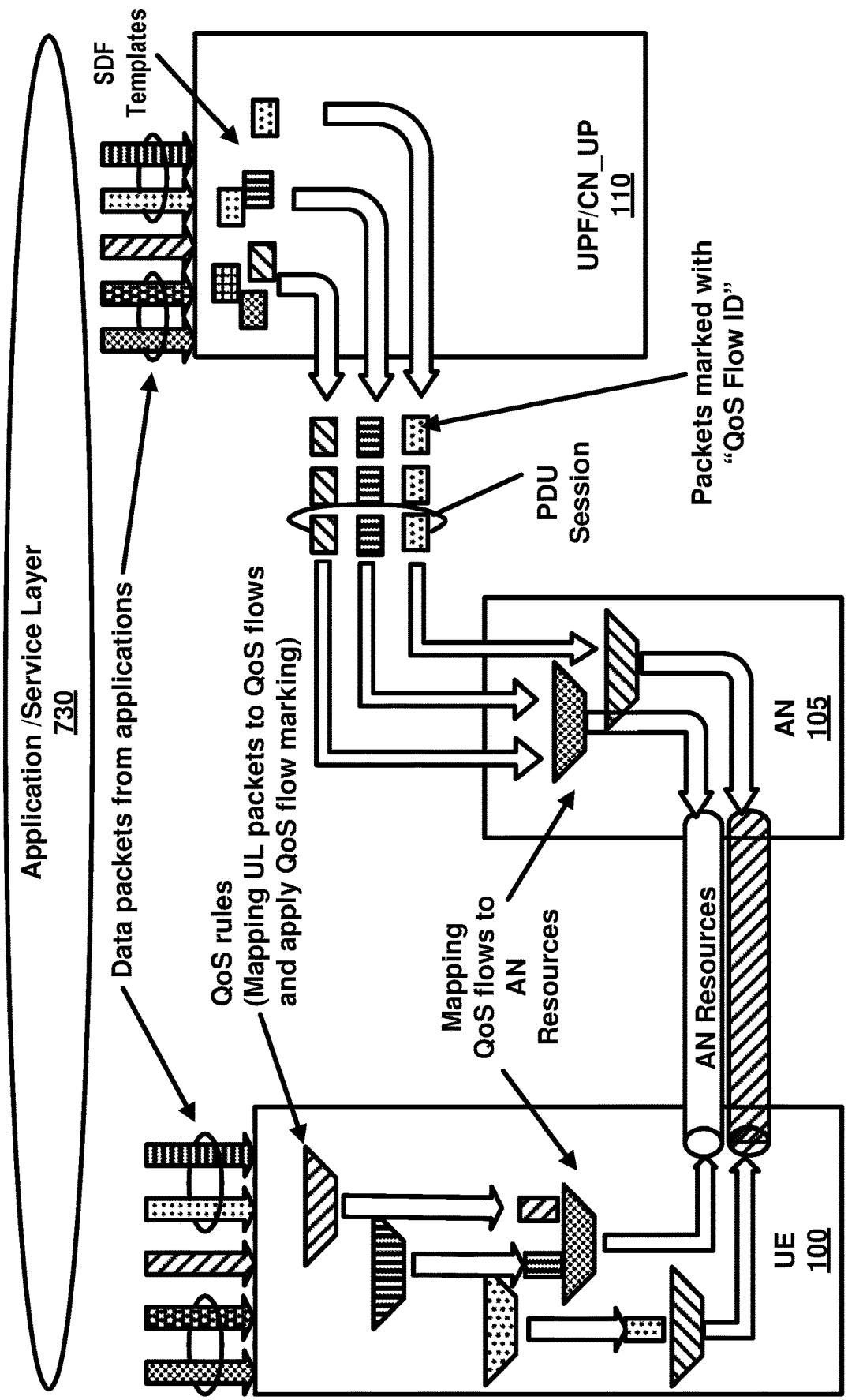
FIG. 7 is diagram for classification and marking traffic as per an aspect of an example embodiment of the disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the UPF 110 (CN_UP) 110, AN 105 and/or UE 100. Packets may arrive from and/or destined to the application/service layer 730 of UE 100, UPF 110 (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN 105 as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may also include point-to-point reference points where necessary. (2) FIG. 2 is an example reference point representation, showing the interaction between the NF services in the network functions described by point-to-point reference point (e.g. N11) between any two network functions.

Figure 10:
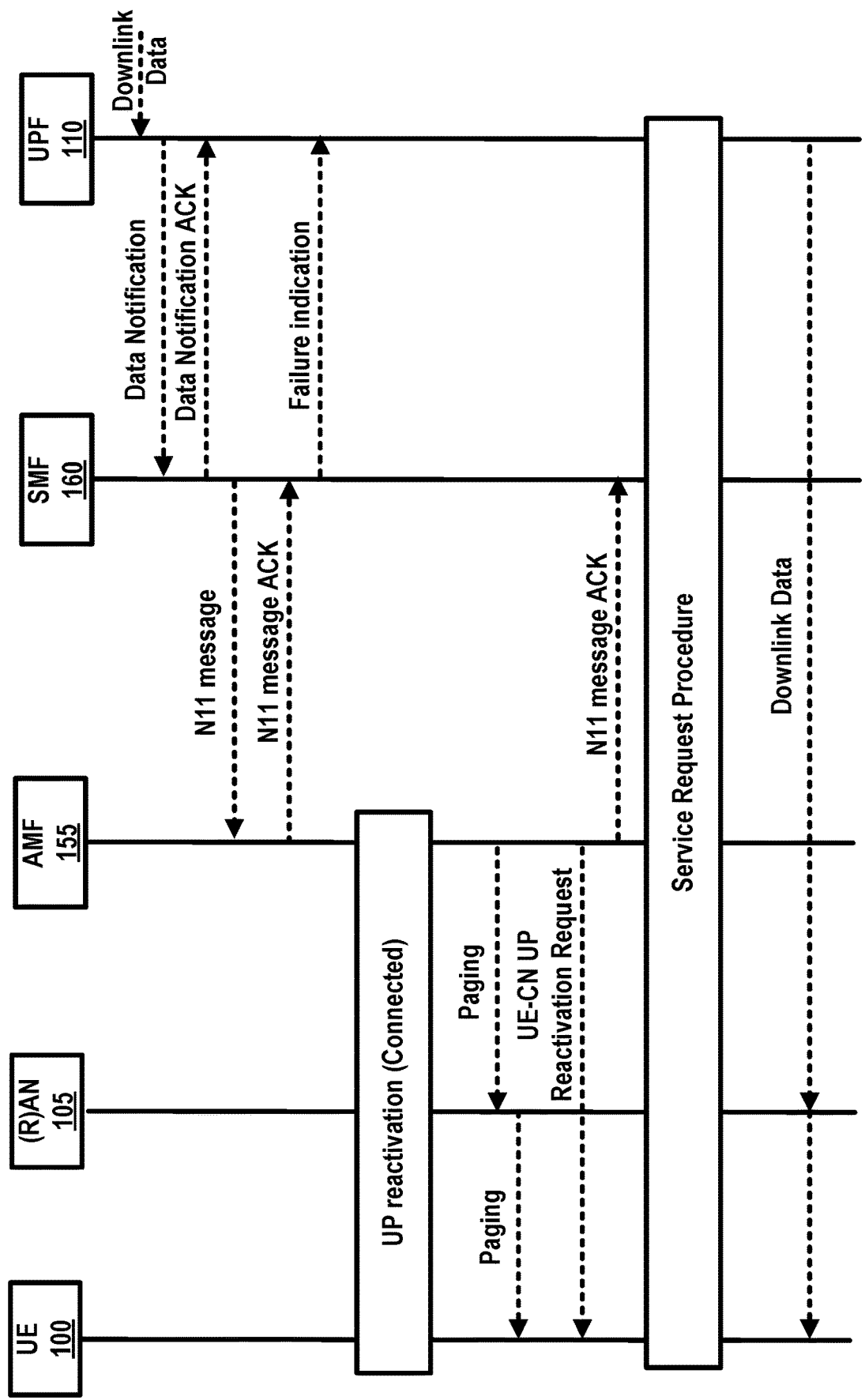
FIG. 10 is an example call flow as per an aspect of an embodiment of the disclosure.

In an example embodiment as depicted in FIG. 10, a network may signal (e.g., N1 signaling to the UE 100, Mobile-terminated SMS, User Plane connection activation for PDU Session(s) to deliver mobile terminating user data) with a wireless device, a UE 100. If the procedure may be triggered by a SMSF, a PCF, and/or a UDM, the SMF 160 in FIG. 10 may be replaced by the SMSF, the PCF or the UDM. If the UE 100 is in CM IDLE state or CM-CONNECTED state in 3GPP access, the network may initiate a network triggered service request procedure. If the UE 100 is in CM-IDLE state, and asynchronous type communication may not be activated, the network may send a paging request to (R)AN/UE. The paging request may trigger a UE 100 triggered service request procedure in the UE 100. If asynchronous type communication is activated, the network may store the received message and may forward the message to the (R)AN, and/or the UE 100 (e.g., may synchronize the context with the (R)AN, and/or the UE) when the UE 100 may enter CM-CONNECTED state.

If the UE 100 may be in CM-IDLE state in non-3GPP access and if the UE 100 may be simultaneously registered over 3GPP and non-3GPP accesses in a PLMN, the network may initiate a network triggered service request procedure over 3GPP access.

When a UPF 110 may receive data (e.g., downlink data) for a PDU Session and there may be no (R)AN 105 tunnel information stored in the UPF 110 for the PDU Session, the UPF 110 may buffer the data. In an example embodiment, the SMF 160 may notify the UPF 110 not to buffer the data.

The UPF 110 may send a first message, a data notification message to the SMF 160 indicating arrival of data (e.g., downlink data) for the UE. The first message may comprise one or more of a PDU session identifier, an allocation and retention priority parameter and/or the like. The allocation and retention priority parameter may be a QoS parameter that may comprise information about the priority level, the pre-emption capability and the pre-emption vulnerability, and/or the like of a resource request. The priority level may indicate the relative importance of a resource request and may allow deciding whether a new QoS flow may be accepted or may be rejected (e.g., in case of resource limitations). In an example, the priority level e.g., ARP, may be used to decide which existing QoS flow to pre-empt during resource limitations. In an example, a range may be assigned for the ARP priority levels (e.g., the ARP priority level may be 1 to 15 with 1 as a high level of priority). The pre-emption capability information may indicate whether a service data flow may get resources that were already assigned to another service data flow with a lower priority level. The pre-emption vulnerability information may indicate whether a service data flow may lose the resources assigned to it in order to admit a service data flow with higher priority level. In an example, the pre-emption capability and the pre-emption vulnerability parameters may be a parameter, variable (e.g., a flag and or a binary value set to 'yes' or 'no'), and/or the like.

In an example embodiment, the UPF 110 may receive a first downlink data packet. The UPF 110 may send the first message, the data notification message to the SMF 160, if the SMF 160 has not previously notified the UPF 110 to not send the Data Notification to the SMF 160.

In an example, if the UPF 110 may receive additional downlink data packets for a QoS Flow in the same PDU Session with the same or a lower priority than used in any previous data notification sent for the PDU Session, the UPF 110 may buffer the downlink data packets without sending a new data notification.

In an example, if the UPF 110 may receive additional downlink data packets for a QoS Flow in the same PDU Session with a higher priority than used in any previous data notification for this PDU Session, the UPF 110 may send the new data notification message to the SMF 160 indicating the higher priority.

In an example, if a paging policy differentiation feature is supported by the UPF 110 and if the paging policy differentiation may be activated by the SMF 160, the UPF 110 may include a differentiated service code point, DSCP in TOS (IPv4)/TC (IPv6) value from the IP header of the downlink data packet. The paging policy differentiation may allow the AMF 155, e.g., based on operator configuration, to apply different paging strategies for different traffic or service types provided within the same PDU session.

If the SMF 160, while waiting for the user plane to be established in the UPF 110, may receive from a new AMF 155 an N11 message notifying that the new AMF 155 may be serving the UE, the SMF 160 may re-send the data notification message to the new AMF 155.

In an example, the SMF 160 may send to the UPF 110, an acknowledgment for the data notification.

Upon reception of the data notification message at the SMF 160 from the UPF 110, if the PDU session may correspond to a Local Area Data Network, LADN, and the SMF 160 may determine that the UE 100 is outside the area of availability of the corresponding LADN based on the UE 100 location reporting from the AMF 155, the SMF 160 may not trigger a notification to the AMF 155. The SMF 160 may notify the UPF 110 that originated the data notification to discard downlink data for the PDU sessions and/or to not provide further data notification messages. In an example, the SMF 160 may determine not to contact the AMF 155 if the SMF 160 had previously been notified by the AMF 155 that the UE 100 may be unreachable; or if the UE 100 may be reachable only for regulatory prioritized service and/or the PDU Session may be for regulatory prioritized service.

The SMF 160 may determine the AMF 155 and may send an N11 message comprising: a SUPI, the PDU Session ID, N2 SM information (PDU Session ID, QoS profile, CN N3 Tunnel Info, S-NSSAI), the ARP parameter, a Paging Policy Indication and/or the like to the AMF 155 including the ARP parameter and the PDU Session ID received in the Data Notification message from the UPF 110.

If the SMF 160, while waiting for the user plane connection to be activated, may receive any additional data notification message for the same PDU Session with higher priority than indicated in any previous data notification for the PDU Session, the SMF 160 may send to the AMF 155, a new N11 message indicating the higher priority and the PDU Session ID.

If the SMF 160, while waiting for the User Plane to be activated, may receive an N11 message response from the new AMF 155 other than the one to which the SMF 160 sent an N11 message, the SMF 160 may send to the new AMF 155, the N11 message.

Figure 11:
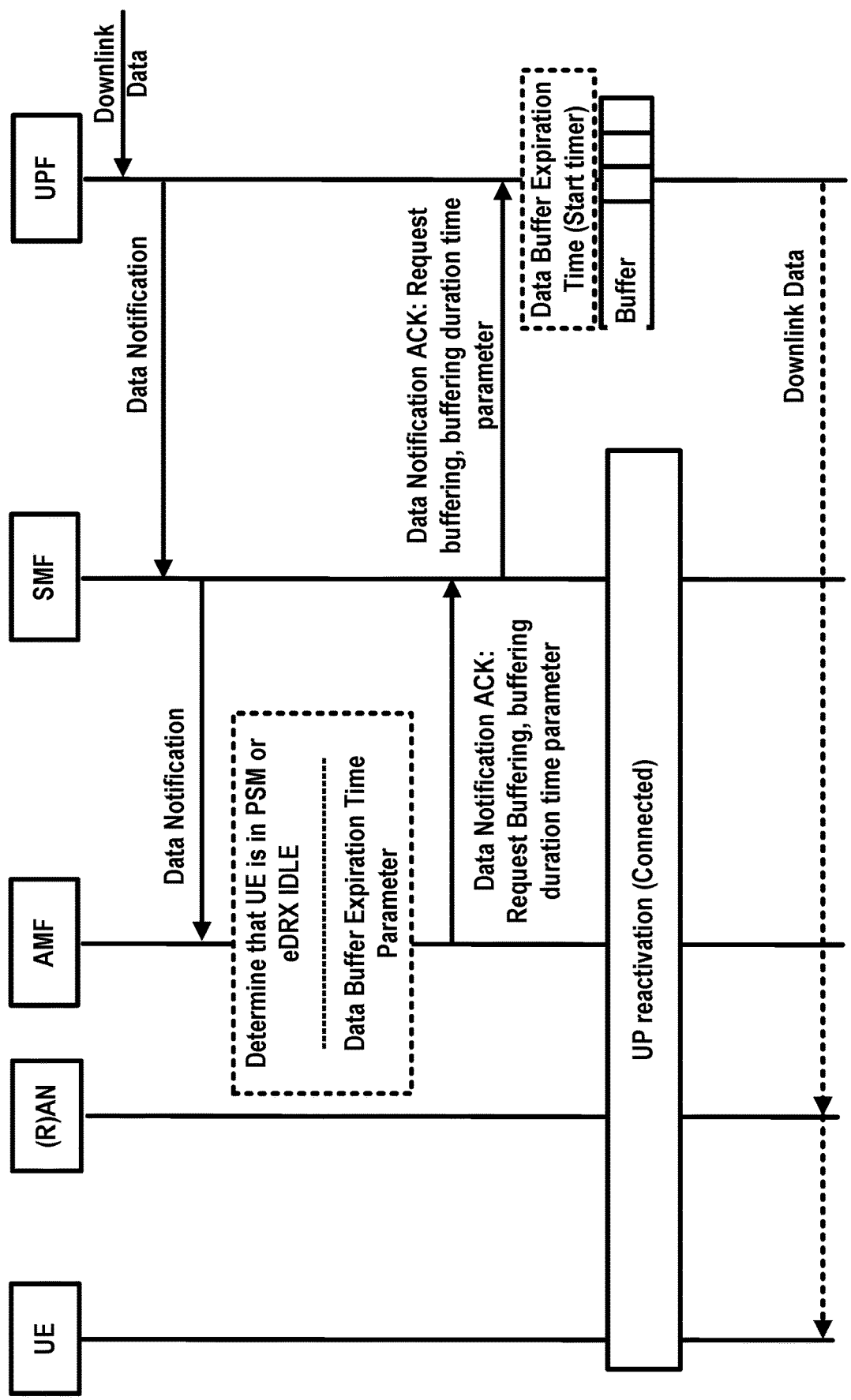
FIG. 11 is an example call flow as per an aspect of an embodiment of the disclosure.
Figure 14:
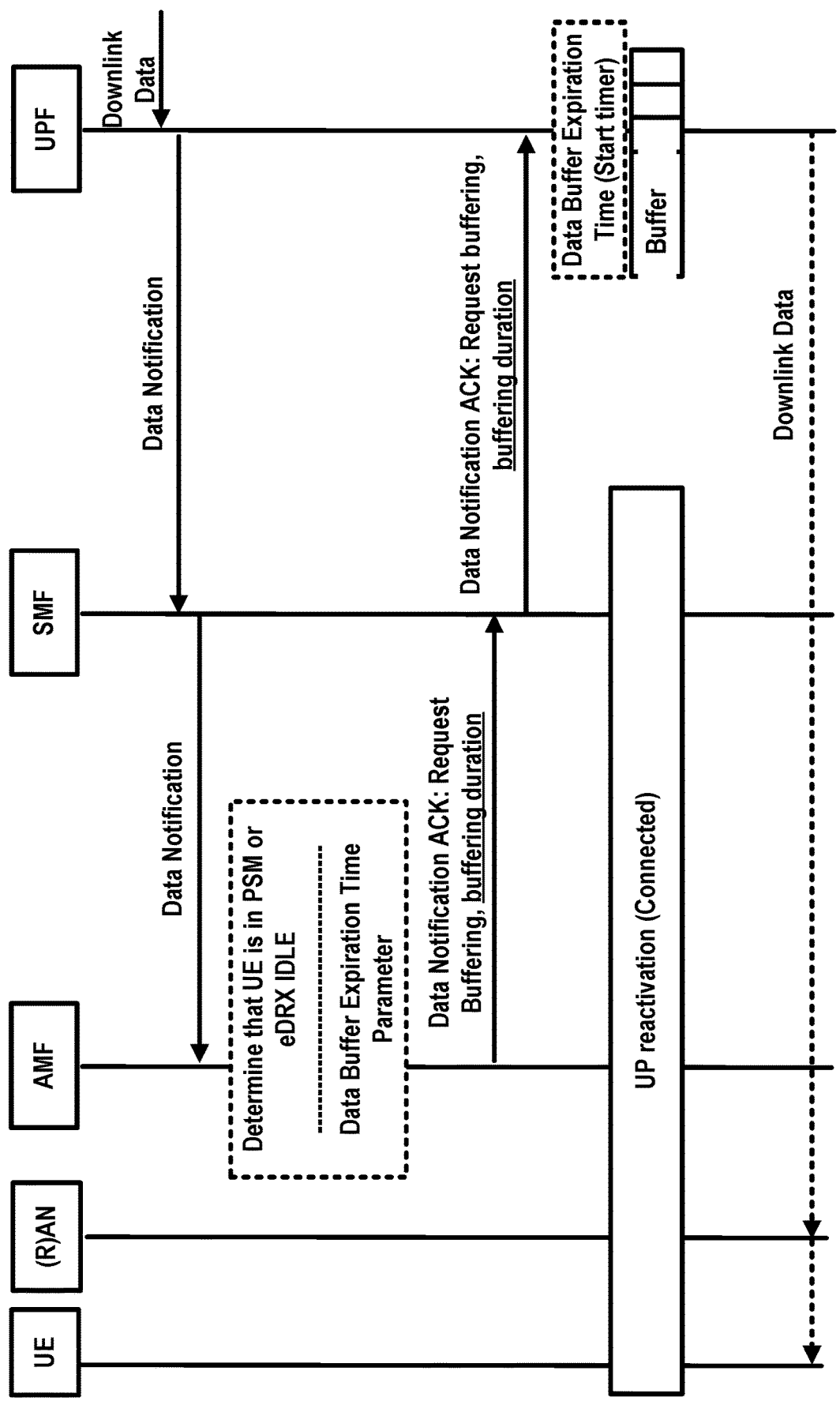
FIG. 14 is an example call flow as per an aspect of an embodiment of the disclosure.

In the illustrated examples of FIG. 11 and FIG. 14, the UPF 110 may receive data for the wireless device, the UE 100. The UPF 110 may send the first message (e.g. the data notification message) to the SMF 160 indicating arrival of the data (e.g., downlink data) for the UE 100.

The SMF 160 may send to the AMF 155 a second message indicating arrival of the data for the UE 100 in response to receiving the first message. The second message may comprise one or elements of the first message, e.g. a subscriber permanent identifier, SUPI, the PDU session ID, the paging policy indication, the N2 session management, N2 SM information (e.g., QoS profile, CN N3 Tunnel Info, S-NSSAI), the allocation and retention priority parameter, ARP, and/or the like.

The AMF 155 may determine, based on a buffering duration time parameter, a first data buffer expiration time parameter, if the UE 100 is unreachable. In an example, if the AMF 155 may determine that the UE 100 may be in a power saving state (e.g. Power Saving Mode or extended idle mode Discontinuous Reception, DRX parameter, extended discontinuous reception (eDRX) parameter, eDRX cycle, and/or the like) and may not be reached by paging, the AMF 155 may determine that the UE 100 is unreachable and/or may invoke extended buffering (e.g., depending on operator configuration). In an example, the AMF 155 may derive an expected time before the UE 100 becomes reachable (e.g. radio bearers may be established to the UE) and determine the buffering duration time parameter based on the expected time. The AMF 155 may indicate a data buffering request to the SMF 160 via a third message (e.g. a data notification acknowledgment message). The third message may comprise at least one of the buffering duration time parameter, the first data buffer expiration time parameter, and/or a packet count parameter (e.g., a buffering packet count parameter). The AMF 155 may store and/or retain the first data buffer expiration time parameter as a mobility management context (MM context) for the UE based at least on the buffering duration time parameter. In an example, the discontinuous reception (DRX) cycle and/or eDRX cycle parameter may be determined based on a time interval or the number of radio frames within the cycle or an interval (e.g., time interval). In an example, the eDRX cycle may be a time interval between the first paging occasion occurring after successive extended DRX periods. In an example, the DRX cycle may be an individual time interval between monitoring paging occasion for the UE 100.

In an example, the AMF 155 may use additional information based on a service level agreement, SLA with a user (e.g., MTC user) for when to invoke extended buffering, e.g. invoke it for a certain DDN/APN, do not invoke it for certain subscribers, invoke extended buffering in conjunction with availability after data notification failure and UE 100 reachability monitoring events, and/or the like.

In an example, the AMF 155 may send to the SMF 160, a third message in response to receiving the second message. The third message may indicate an acknowledgment for the second message. The third message may further comprise at least one or more of the buffering duration time parameter, the packet count parameter, the data buffering request, and/or the like. In an example, the SMF 160 may retain at least one or more of the elements and/or parameters received from the AMF 155 via the third message.

In an example, the SMF 160 may determine and/or store/retain a new value, a second data buffer expiration time parameter for the buffering expiration time (may be the same value as the one stored at the AMF 155) in a session management context, (SM context) for the UE 100 based on the buffering duration time parameter. In an example, the SMF 160 may buffer the data based on the buffering duration time parameter, the second data buffer expiration time parameter and one or more of the elements of the third message. In an example, the first data buffer expiration time parameter and/or the second data buffer expiration time parameter may be used for UEs using power saving state and may indicate that there may be buffered data in the UPF 110 and/or the SMF 160 and that the user plane setup procedure may be needed when the UE 100 may make and/or establish a signaling with the network. In an example, when the first data buffer expiration time parameter has expired, the AMF 155 may consider no data (e.g., downlink data) may be buffered and no indications of buffered (downlink) data waiting may be sent during context transfers at TAU procedures, and/or the like. In an example, based on the first data buffer expiration time, and/or a notification from the network (e.g., data notification), if the AMF 155 may be aware that signaling or data may be pending in the network (e.g., at the UPF 110, SMF 160, AMF 155, and/or the like), and the UE 100 may not be reachable for a duration (e.g., the UE 100 may be in PSM or eDRX configured), the AMF 155 may indicate to the RAN (e.g, gNB) via N2 messaging (e.g., in the next NG-AP message, S1-AP message, and/or the like) that data or signaling may be pending to be transmitted to the UE (e.g, a data pending indication).

In an example, when the SMF 160 may receive the data buffering request in the third message (e.g., the data notification acknowledgment message), the SMF 160 may retain/store the second data buffer expiration time parameter. The second data buffer expiration time parameter, may be based on the buffering duration time parameter. The SMF 160 may not send any additional data notifications if subsequent data notifications and/or (downlink) data packets are received by the SMF 160 from the UPF 110, before the second data buffer expiration time parameter has expired for the UE.

In an example FIG. 11, the SMF 160 may send to the UPF 110, a fourth message indicating to buffer the data at the UPF 110. The fourth message may comprise the buffering duration time parameter, the packet count parameter and/or the like. The UPF 110 may determine based on the elements of the fourth message a third data buffer expiration time parameter. In an example, the UPF 110 may retain the third data buffer expiration time parameter, start a timer and start buffering the (downlink) data for a first time duration of the buffering duration time parameter or based on one or more of, the elements of the fourth message and the third data buffering expiration time parameter. Upon expiry of the timer based on the first time duration or third data buffer expiration time parameter, the UPF 110 may discard the data, or resend the data notification based on one or more of the elements of the first message.

Figure 12:
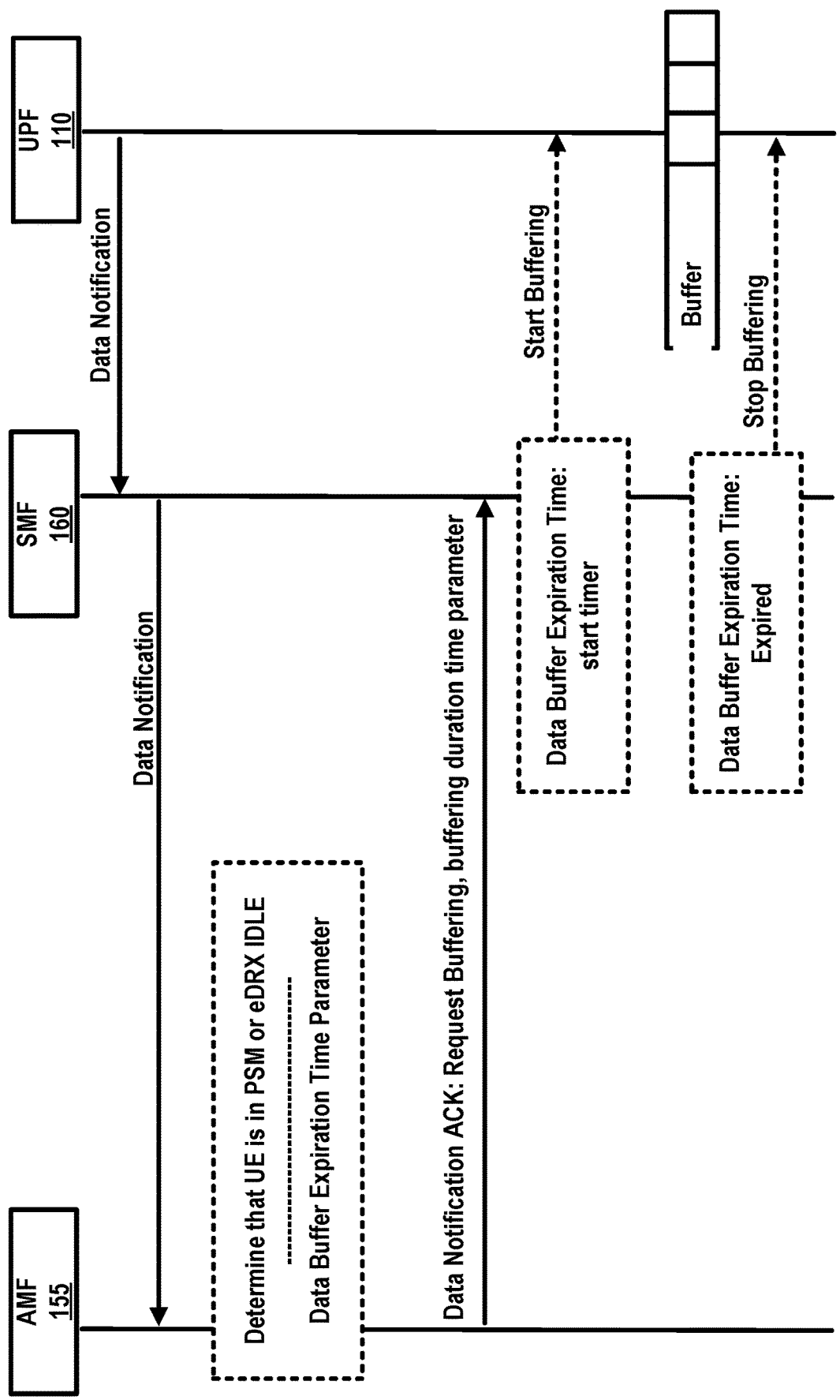
FIG. 12 is an example call flow as per an aspect of an embodiment of the disclosure.

In an example FIG. 12, the SMF 160 may derive the second data buffer expiration time parameter based on the buffering duration time parameter and elements of the third message. In an example, the SMF 160 may handle the timer based on the second data buffer expiration time parameter and may send notifications to the UPF 110 to guide the UPF 110 to start or stop buffering the data or to discard the data. The SMF 160 may send to the UPF 110, a fifth message indicating to start buffering the data based on one or more elements of the third message, and the second data buffer expiration time parameter. The fifth message may comprise one or more of the PDU session ID, an indication to start buffering, and/or the like. Upon receiving the indication to start buffering by the UPF 110, the UPF 110 may start buffering the (downlink) data. In an example, the SMF 160 may send to the UPF 110, a sixth message indicating to stop buffering the data based on one or more elements of the third message, and/or the second data buffer expiration time parameter. Upon receiving the indication to stop buffering by the UPF 110, the UPF 110 may stop buffering the (downlink) data, and/or discard the (downlink) data. The sixth message may comprise one or more of the PDU session ID, an indication to stop buffering, and/or the like. In an example, the SMF 160 may send to the UPF 110, a seventh message indicating to discard the buffered data based on one or more elements of the third message. The seventh message may comprise one or more of the PDU session ID, an indication to discard the buffered data, and/or the like.

In an example, when the UPF 110 may receive the data buffering request from the SMF 160, the UPF 110 may retain/store a third data buffer expiration time parameter. The third data buffer expiration time parameter, may be based on the buffering duration time parameter. The UPF 110 may not send any additional data notifications if subsequent data notifications and/or (downlink) data packets are received in the UPF 110 before the third data buffer expiration time parameter has expired for the UE. In an example, the UPF 110 may receive data packets and/or data notifications by other UPFs.

Figure 13:
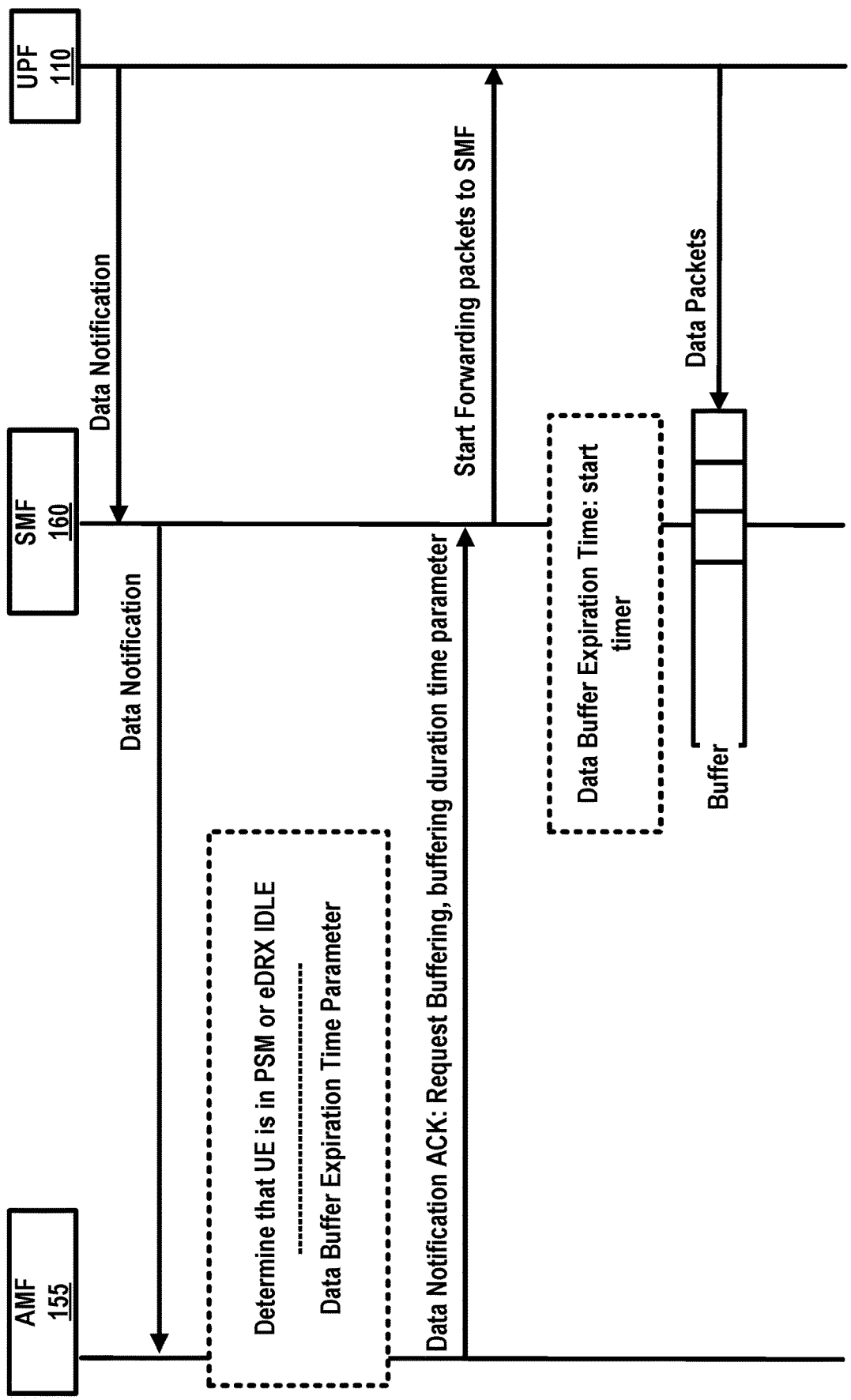
FIG. 13 is an example call flow as per an aspect of an embodiment of the disclosure.

In an example FIG. 13, the SMF 160 may send to the UPF 110, an eighth message configured to request forwarding the data from the UPF 110 to the SMF 160. The eighth message may comprise one or more of a SMF 160 identifier, a SMF 160 TEID (e.g., F-TEID), and/or the like. Upon receiving the data from the UPF 110, the SMF 160 may start buffering the data for a second time duration of the buffering duration time parameter, or based on one or more elements of the third message, and/or the second data buffer expiration time parameter. In an example, upon expiry of the second time duration or the second data buffer expiration time parameter at the SMF 160, the SMF 160 may discard the buffered data, resend a data notification to the AMF 155, and/or forward the data to the UPF 110. In an example, the SMF 160 may forward the buffered data to the UPF 110 in response to receiving a user plane (re)activation message from the AMF 155, or upon receiving an indication from the AMF 155 that the user plane activation and/or reactivation has been successful.

In an example, the SMF 160 may receive from the AMF 155 a message indicating a successful user plane (re)activation. Upon receiving the successful user plane (re)activation by the SMF 160, if data buffering and transmission of data over control plane is supported, the SMF 160 upon expiry of the second time duration or expiry of the second data buffer duration time parameter, may forward the buffered data to the AMF 155 via a SM NAS message. In an example, the wireless device, the UE, may receive, from the SMF 160, (downlink) data that may be included in the SM NAS message. The SM NAS message, may comprise one or more of the UE 100 identifier, a protocol discriminator, security header type, control plane service request message identity, a NAS key set identifier, a NAS message container, a PDU session context status, a bearer context status, device properties, and/or the like. The NAS message container may comprise the downlink data to be transmitted to the wireless device, the UE 100 from the SMF 160. In an example, the downlink data may be encapsulated in the SM NAS message. In an example, the downlink data may be sent via the NAS message container of the SM NAS message.

In an example, if the UE 100 is in CM-IDLE state, and the AMF 155 may determine that the UE may be unreachable for paging, the AMF 155 may send an N11 message to the SMF 160, or other network functions from which the AMF 155 received the request message, indicating that the UE 100 may be unreachable, or the AMF 155 may perform asynchronous type communication and may store the UE 100 context based on the received message. If asynchronous type communication may be invoked, the AMF 155 may initiate communication with the UE 100 and (R)AN 105 when the UE 100 may be reachable (e.g. when the UE 100 enters CM-CONNECTED state).

In an example, if the AMF 155 may determine that the UE 100 may be unreachable for the SMF 160 (e.g., due to the UE 100 in MICO mode or the UE 100 is registered over non-3GPP access and/or its state is CM-IDLE), the AMF 155 may reject the request from the SMF 160. The AMF 155 may include in the reject message an indication that the SMF 160 may not send data notifications to the AMF 155, if the SMF 160 has not subscribed to the event of the UE 100 reachability. The AMF 155 may store an indication that the SMF 160 has been informed that the UE 100 may be unreachable.

In an example, if the UE 100 is not in MICO mode and/or the AMF 155 may detect that the UE 100 is in a Non-allowed area unless the request from the SMF 160 is for regulatory prioritized service, the AMF 155 may reject the request from the SMF 160 and may notify the SMF 160 that the UE 100 is reachable only for regulatory prioritized service. The AMF 155 may store an indication that the SMF 160 has been informed that the UE 100 is reachable only for regulatory prioritized service.

In an example, if the registration procedure with change of AMF 155 may be in progress when the old AMF 155 may receive an N11 message from the SMF 160, the old AMF 155 may reject N11 message with an indication that the N11 message has been temporarily rejected. Upon reception of an N11 message Ack by the SMF 160 from the AMF 155 with an indication that its request has been temporarily rejected, the SMF 160 may start a locally configured guard timer, e.g., a first guard timer, and wait for any N11 message to come from a new AMF 155. Upon reception of a new N11 message from the new AMF 155, the SMF 160 may send a new N11 message (with Data Notification) to the new AMF 155 from which it received the N11 message. If the SMF 160 may decide that the control plane buffering may apply, the SMF 160 may request the UPF 110 to start forwarding the (downlink) data towards the SMF 160.

In an example, the SMF 160 may notify the UPF 110 about a user plane setup failure. If the SMF 160 receives an indication from the AMF 155 that the UE 100 is unreachable or reachable only for regulatory prioritized service, the SMF 160 may (e.g., based on network policies) either indicate to the UPF 110 to stop sending data notifications and/or to stop buffering (downlink) data or apply extended/temporary buffering. The SMF 160 may refrain from sending further N11 messages for (downlink) data to the AMF 155 while the UE 100 is unreachable.

Upon receiving the information that the N11 message requested from the SMF 160 has been temporarily rejected, and receiving the (downlink) data notification from UPF 110, the SMF 160 may request the UPF 110 to apply extended buffering, temporary buffering and/or buffering based on the first guard timer parameter, a second guard timer locally configured at the UPF 110, and/or elements of the third message.

In an example, upon reception of the N11 message Ack by the SMF 160, with the indication that its request has been temporarily rejected, the SMF 160 may notify the UPF 110 and the UPF 110 may start a locally configured guard timer, the second guard timer, and may buffer for the expiry duration of the second guard timer, all downlink data received for the UE 100 and may wait for a N4 message. In an example, the UPF 110 may buffer the data based on the first guard timer or the second guard timer parameter.

In an example, upon reception of an N11 message Ack by the SMF 160 with an indication that its request has been temporarily rejected, the SMF 160 may start the locally configured guard timer, the first guard timer, and may notify the UPF 110 to start buffering the (downlink) data packet (the SMF 160 may explicitly stop the buffering at the UPF 110 if needed). Upon reception of a new N4 message by the UPF 110 from a new SMF 160, the UPF 110 may re-send the data notification message to the new SMF 160 from which it received the N4 message. If the first guard timer expires, the SMF 160 notifies the UPF 110 to release/stop buffering). The SMF 160 may release buffering and discard the buffered data if a PDU session deactivation/delete message arrives.

In an example, upon reception of the N11 message Ack with the indication that its request has been temporarily rejected, the SMF 160 may start the locally configured guard timer, the first guard timer, and may notify the UPF 110 to start buffering the (downlink) data (the SMF 160 may explicitly stop the buffering at the UPF 110 if needed). Upon reception of a new N11 message from a new AMF 155, the SMF 160 re-sends the data notification message to the new AMF 155 from which it received the new N11 message. If the first guard timer expires, the SMF 160 may notify the UPF 110 to release/stop buffering the (downlink) data. The SMF 160 may release the buffered data if a PDU session deactivation/delete message arrives.

In an example, if the UE 100 is in CM-IDLE state in 3GPP access, the AMF 155 may send a paging message to RAN node(s). If the UE 100 is in RM-REGISTERED state and CM-IDLE and reachable, the AMF 155 may send the paging message (NAS ID for paging, Registration Area list, Paging DRX length, Paging Priority indication, access associated to the PDU Session) to (R)AN 105 node(s) belonging to the Registration Area(s) in which the UE 100 may be registered, the RAN node may page the UE, including the access associated to the PDU Session in the paging message if received from the AMF 155. If the UE 100 CM state in the AMF 155 is CM-IDLE in 3GPP access, the paging message may include the access type associated with the PDU session in the SMF 160. The UE, upon reception of the paging message containing an access type, may reply to the 5GC via the 3GPP access using a NAS Service Request message, which may contain the list of PDU sessions associated with the received access type and whose UP connections may be re-activated over 3GPP (i.e. the list may not contain the PDU sessions whose UP connections may not be re-activated on 3GPP based on UE 100 policies). If the PDU session for which the UE 100 has been paged is in the list of the PDU sessions provided in the NAS Service Request, the 5GC may re-activate the PDU session UP connection over 3GPP access. In an example, if Paging Policy Differentiation may be supported, the AMF 155 may include Paging Policy Indication in Paging Request message.

Paging strategies may be configured in the AMF 155 for different combinations of DNN, Paging Policy Indication, PDU Session IDs from SMF 160 (when available) and other PDU Session context information identified by PDU Session ID received in N11 message. In an example, the paging strategies may include paging retransmission scheme (e.g. how frequently the paging is repeated or with what time interval); determining whether to send the Paging message to the (R)AN 105 nodes during certain AMF 155 high load conditions; whether to apply sub-area based paging (e.g. first page in the last known cell-id or TA and retransmission in all registered TAs).

The AMF 155 and/or the (R)AN 105 may support further paging optimisations in order to reduce the signaling load and the network resources used to successfully page the UE. In an example, the AMF 155 may implement specific paging strategies (e.g. the N2 Paging message may be sent to the (R)AN 105 nodes that served the UE 100 last). In an example, the AMF 155 may consider Information On Recommended Cells and/or RAN nodes provided by the (R)AN 105 at transition to CM-IDLE state. The AMF 155 may take the (R)AN 105 nodes related part of this information into account to determine the (R)AN 105 nodes to be paged, and may provide the information on recommended cells within the N2 Paging message to each of these (R)AN 105 nodes. In an example, the (R)AN 105 may considering the Paging Attempt Count Information provided by the AMF 155 at paging.

In an example, if the UE 100 Radio Capability for Paging Information is available in the AMF 155, the AMF 155 may add the UE 100 Radio Capability for paging information in the N2 Paging message to the (R)AN 105 nodes. In an example, if the information on Recommended Cells and/or (R)AN 105 nodes for paging is available in the AMF 155, the AMF 155 may take that information into account to determine the (R)AN 105 nodes for paging and, when paging a (R)AN 105 node, the AMF 155 may transparently convey the information on recommended cells to the (R)AN 105 node. In an example, the AMF 155 may include in the N2 Paging message(s) the paging attempt count information. The paging attempt count information may be the same for all (R)AN 105 nodes selected by the AMF 155 for paging. In an example, the AMF 155 may supervise the paging procedure with a timer. If the AMF 155 receives no response from the UE 100 to the Paging Request message, the AMF 155 may apply further paging according to any applicable paging strategy.

In an example, if the AMF 155 receives no response from the UE, the AMF 155 may consider the UE 100 as unreachable and the SM N2 message may not be routed to the (R)AN, so the AMF 155 may return an "N11 message Reject" with an appropriate "failure cause", e.g. UE 100 unreachability, to SMF 160 or other network functions to indicate the failure of "message routing service", unless the AMF 155 may be aware of an ongoing mobility management, MM procedure that may prevent the UE 100 from responding, e.g., the AMF 155 may receive an N14 Context Request message indicating that the UE 100 may perform registration procedure with another AMF 155. When an "N11 message Reject" is received, SMF 160 may inform the UPF 110.

In an example, if the UE 100 is in CM-IDLE state in 3GPP access, upon reception of paging request for a PDU Session associated to 3GPP access, the UE 100 may initiate a UE 100 triggered service request procedure. In the UE 100 triggered service request procedure, the AMF 155 may send N11 message to SMF(s) associated with the PDU Session identified in MM NAS Service Request message if there may be any. The AMF 155 may not send the N11 message to the SMF(s) from which it receives the N11 message previously prior to the UE 100 triggered service request procedure. In an example, the UE 100 triggered service request procedure may be used by the UE 100 in CM-IDLE state to request the establishment of a secure connection to the AMF 155. The service request procedure may be used to activate a user plane connection for an established PDU Session. The service request procedure may be triggered by the UE 100 or the 5GC, and may be used when the UE 100 is in CM-IDLE and/or in CM-CONNECTED and may allow selectively to activate user plane connections for some of the established PDU Sessions.

In an example, if the UE 100 is in CM-IDLE state in both non-3GPP and 3GPP accesses, upon reception of paging request for a PDU Session associated to non-3GPP access, the UE 100 may initiate the UE 100 triggered Service Request procedure indicating the list of PDU Sessions associated with non-3GPP that may be allowed by UE 100 policies over the 3GPP access.

In an example, the UPF 110 may transmit the buffered (downlink) data toward the UE 100 via (R)AN 105 node which performed the Service Request procedure.

In an example, the UPF 110 may send to the SMF 160 in response to receiving data for the wireless device, the first message indicating the data notification for the wireless device. The first message may comprise at least one of the PDU Session ID, the allocation and retention priority parameter (ARP) and/or the like.

In an example, the SMF 160 may send to the AMF 155 in response to the first message, the second message indicating the data notification for the wireless device. The second message may comprise at least one of the PDU Session ID, the allocation and retention priority parameter (ARP), the subscriber permanent identifier (SUPI), the paging policy indication, N2 SM information (e.g., QoS profile, CN N3 Tunnel Info, S-NSSAI), and/or the like.

In an example, the AMF 155 may determine that the wireless device may be unreachable.

In an example, in response to determining that the wireless device may be unreachable, the AMF 155 may send to the SMF 160, the third message indicating the request to buffer the data. The third message may comprise the buffering duration time parameter.

In an example embodiment, the AMF 155, may determine the first data buffer expiration time parameter based on the buffering duration time parameter. The AMF 155 may the first data buffer expiration time parameter.

In an example embodiment, the SMF 160, may determine the second data buffer expiration time parameter based on the buffering duration time parameter. The SMF 160 may retain the second data buffer expiration time parameter.

In an example embodiment, the AMF 155 may determine that the wireless device may unreachable and derives the buffering duration time parameter based on at least one of the wireless device response time, one or more power saving mode parameters of the wireless device, one or more DRX or extended idle mode DRX parameters of the wireless device, and/or the like.

In an example embodiment, the SMF 160 may send to the UPF 110 in response to the third message, the fourth message indicating to buffer the data at the UPF 110. The fourth message may comprise the buffering duration time parameter. In an example, the UPF 110 may buffer the downlink data for the first time duration of the buffering duration time parameter and one or more elements of the fourth message.

In an example embodiment, the SMF 160 may start the timer in response to the third message. The timer may be determined based on the buffering duration time parameter;

The SMF 160 may send to the UPF 110, the fifth message indicating the UPF 110 to start buffering the data. In an example, the SMF 160 may send to the UPF 110, upon expiry of the timer, the sixth message indicating the UPF 110 to stop buffering the data.

In an example embodiment, the fifth message may comprise the PDU session ID.

In an example embodiment, the sixth message may comprise the PDU session ID.

In an example embodiment, the SMF 160 may send to the UPF 110, a seventh message indicating the UPF 110 to discard the buffered data. The seventh message may comprise the PDU session ID.

In an example embodiment, the SMF 160 may send to the UPF 110, the eighth message indicating the request to forward the data from the UPF 110 to the SMF 160. The eighth message may comprise one or more of the SMF 160 identifier, the SMF 160 TEID, and/or the like.

In an example embodiment, the SMF 160 may receive from the UPF 110, the data in response to the eighth message. The SMF 160 may buffer the data for the second time duration of the buffering duration time parameter.

In an example embodiment, the SMF 160 may send to the UPF 110, the data if the second time duration expires, or the SMF 160 receives, from the AMF 155, the message indicating the user plane (re)activation.

In an example embodiment, the SMF 160 may send to the wireless device via the AMF 155, the data via the SM-NAS message if the second time duration expires, or the SMF 160 may receive, from the AMF 155, the message indicating a successful user plane (re)activation.

In an example embodiment, the AMF 155 may determine the packet count parameter for the data. The AMF 155 may send to the SMF 160, the packet count parameter via the third message. In an example, the SMF 160 may send to the UPF 110, the packet count parameter via the fourth message.

In an example embodiment, the AMF 155 may retain/store the first data buffer expiration time parameter. In an example embodiment, the SMF 160 may retain/store the second buffer expiration time parameter.

In an example embodiment, an access and mobility management function (AMF) may receive from a session management function (SMF), a data notification message for a wireless device indicating that user plane activation for the wireless device is required. The data notification message may comprise: an identifier of a packet data unit (PDU) session of the wireless device, a subscriber permanent identifier, and/or the like. In an example, the AMF may determine a buffering duration for the wireless device in response to the wireless device being unreachable. The AMF may send to the SMF, a data buffering request message to buffer the data for the buffering duration. In an example, data buffering request message may comprise the buffering duration, a packet count parameter, and/or the like.

In an example, the SMF may send to the UPF and in response to the data buffering request message, a second message indicating to buffer the data at the UPF. The second message may comprise the buffering duration, a packet count parameter, and/or the like. In an example, the UPF may buffer the data based on the buffering duration, the packet count parameter, and/or the like.

In an example, the AMF may determine the buffering duration based on at least one of a wireless device response time, one or more power saving mode parameters of the wireless device, one or more DRX or extended idle mode DRX parameters of the wireless device, and/or the like. The AMF in response to the determining, may derive, a first data buffer expiration time parameter based on the buffering duration. The AMF may retain/store the first data buffer expiration time parameter. The AMF may determine that the wireless device is unreachable and may derive the buffering duration.

In an example, a user plane function (UPF) may send to the SMF in response to receiving data for the wireless device, a first message indicating a data notification for the wireless device.

The SMF may receive from the AMF an indication of wireless device reachability. The SMF may send the data to the wireless device via the AMF. The AMF may send to the wireless device, the data over a non access stratum (NAS) message.

In an example, the UPF may discard the data upon expiry of the first time duration. The UPF may transmit to the wireless device the data via a base station upon reactivation of user plane.

The AMF may send to the SMF, upon activation of user plane, a downlink tunneling information. The SMF may send to the UPF, the downlink tunneling information.

In an example, the SMF may determine a second data buffer expiration time parameter based on the buffering duration. The SMF may retain the second data buffer expiration time parameter.

The SMF may receive the data from the UPF. The SMF may buffer the data at the SMF for a second time duration of the buffering duration. The SMF may buffer the data based on a packet count parameter.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 15:
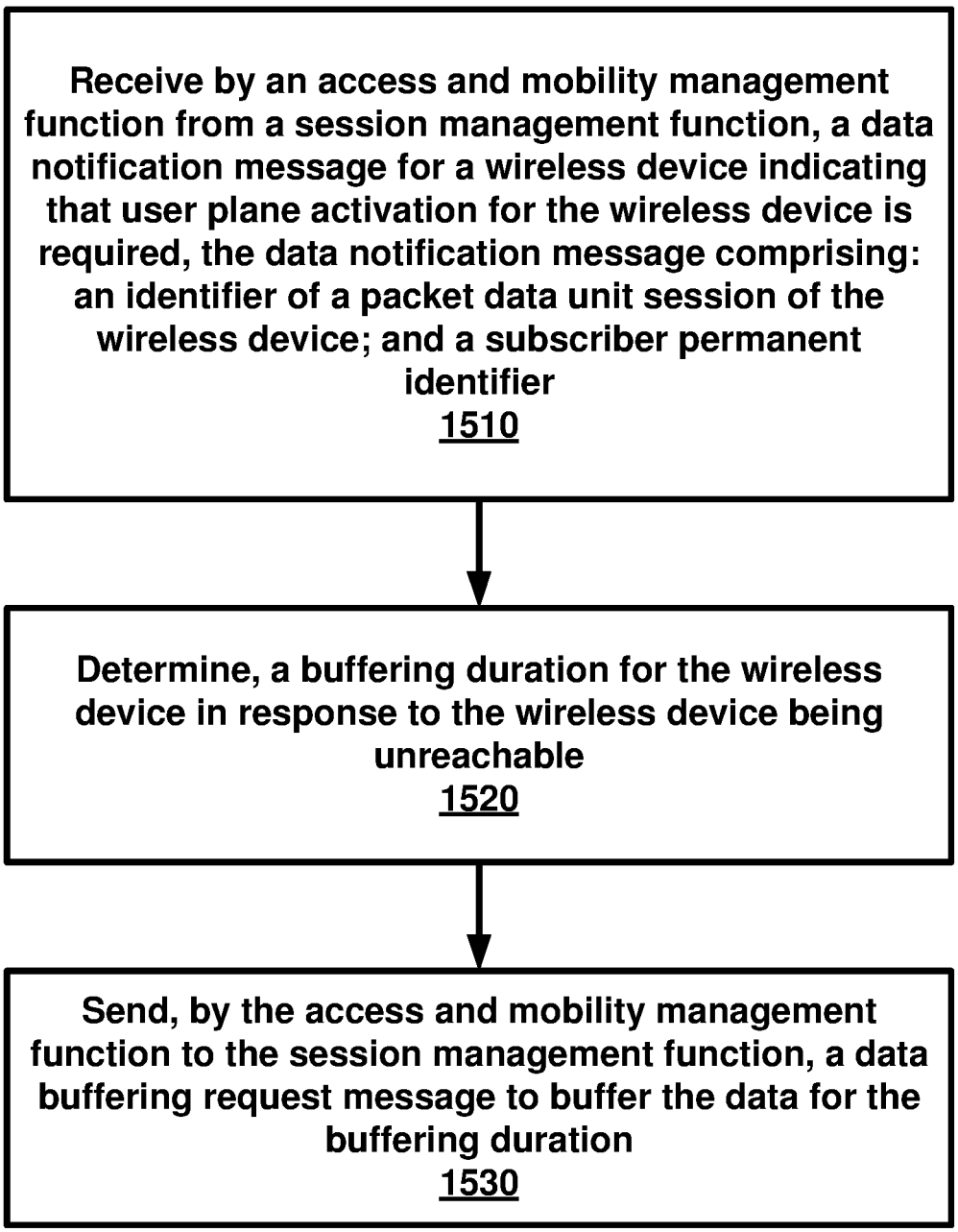
FIG. 15 is a flow diagram of an aspect of an example embodiment of the present disclosure.

FIG. 15 is a flow diagram of an aspect of an embodiment of the present disclosure. At 1510, an access and mobility management function may receive a data notification message from a session management function. The data notification message may be for a wireless device. The data notification message may indicate that user plane activation for the wireless device is required. The data notification message may comprise an identifier of a packet data unit session of the wireless device. The data notification message may comprise a subscriber permanent identifier. At 1520, a buffering duration may be determined for the wireless device in response to the wireless device being unreachable. At 1530, the access and mobility management function may send a data buffering request message to the session management function. The data buffering request message may comprise a request to buffer the data for the buffering duration.

According to an example embodiment, the data buffering request message comprise the buffering duration. According to an example embodiment, the data buffering request message comprise a packet count parameter. According to an example embodiment, the session management function may send a second message to a user plane function in response to the data buffering request message. The second message may indicate to buffer the data at the user plane function. The second message may comprise the buffering duration. The second message may comprise a packet count parameter. According to an example embodiment, the user plane function may buffer the data based on the buffering duration. According to an example embodiment, the user plane function may buffer the data based on the packet count parameter. According to an example embodiment, the user plane function may discard the data upon expiry of the buffering duration. According to an example embodiment, the user plane function may transmit the data to the wireless device via a base station upon reactivation of user plane. According to an example embodiment, the access and mobility management function may send downlink tunneling information to the session management function upon activation of user plane. According to an example embodiment, the session management function may send the downlink tunneling information to the user plane function. According to an example embodiment, the access and mobility management function may determine the buffering duration based on a wireless device response time. According to an example embodiment, the access and mobility management function may determine the buffering duration based on one or more power saving mode parameters of the wireless device. According to an example embodiment, the access and mobility management function may determine the buffering duration based on one or more discontinuous reception or extended idle mode discontinuous reception parameters of the wireless device. According to an example embodiment, the access and mobility management function may derive a first data buffer expiration time parameter based on the buffering duration in response to the determining According to an example embodiment, the access and mobility management function may retain the first data buffer expiration time parameter. According to an example embodiment, a user plane function may send a first message to the session management function in response to receiving data for the wireless device. The first message may indicate a data notification for the wireless device. According to an example embodiment, a first message the access and mobility management function may determine that the wireless device is unreachable and derives the buffering duration. According to an example embodiment, a first message the session management function may receive an indication of wireless device reachability from the access and mobility management function. According to an example embodiment, a first message the session management function may send the data to the wireless device via the access and mobility management function. According to an example embodiment, the access and mobility management function may send the data to the wireless device over a non access stratum message. According to an example embodiment, the session management function may determine a second data buffer expiration time parameter based on the buffering duration. According to an example embodiment, the session management function may retain the second data buffer expiration time parameter. According to an example embodiment, the session management function may receive the data from a user plane function. According to an example embodiment, the data may be buffered at the session management function for a second time duration of the buffering duration. According to an example embodiment, the session management function may buffer the data based on a packet count parameter.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method, comprising:
   sending, by a session management function (SMF) to an access and mobility management function (AMF), a first message for user plane activation of a wireless device, the first message comprising an identifier of a packet data unit session of the wireless device;
   receiving, by the SMF from the AMF and in response to the wireless device being unreachable, a second message to determine an extended buffering time; and
   sending, by the SMF to a user plane function (UPF), a third message comprising the extended buffering time and indicating to buffer downlink data of the wireless device.

2. The method of claim 1, further comprising determining, by the SMF, the extended buffering time in response to receiving the second message.

3. The method of claim 1, wherein the first message comprises a subscription permanent identifier.

4. The method of claim 1, wherein the second message comprises:
   the extended buffering time; and
   a packet count parameter.

5. The method of claim 1, wherein sending the third message is in response to receiving, by the SMF, the second message, the second message comprising:
   the extended buffering time; and
   a packet count parameter.

6. The method of claim 1, further comprising receiving, by the SMF from the AMF, an indication of wireless device reachability.

7. The method of claim 6, further comprising sending, by the SMF to the wireless device via the AMF, the downlink data.

8. The method of claim 1, further comprising determining, by the SMF, a second data buffer expiration time parameter based on the extended buffering time.

9. The method of claim 8, further comprising retaining, by the SMF, the second data buffer expiration time parameter.

10. The method of claim 9, further comprising receiving, by the SMF from the UPF, the downlink data.

11. A apparatus, comprising:
    one or more processors; and
    memory storing instructions that, when executed by the one or more processors, cause a session management function (SMF) to:
      send, to an access and mobility management function (AMF), a first message for user plane activation of a wireless device, the first message comprising an identifier of a packet data unit session of the wireless device;
      receive, from the AMF and in response to the wireless device being unreachable, a second message to determine an extended buffering time; and
      send, to a user plane function (UPF), a third message comprising the extended buffering time and indicating to buffer downlink data of the wireless device.

12. The apparatus of claim 11, wherein the instructions, when executed by the one or more processors, further cause the SMF to determine the extended buffering time in response to receiving the second message.

13. The apparatus of claim 11, wherein the first message comprises a subscription permanent identifier.

14. The apparatus of claim 11, wherein the second message comprises:
    the extended buffering time; and
    a packet count parameter.

15. The apparatus of claim 11, wherein sending the third message is in response to receiving the second message, the second message comprising:
    the extended buffering time; and
    a packet count parameter.

16. The apparatus of claim 11, wherein the instructions, when executed by the one or more processors, further cause the SMF to receive, from the AMF, an indication of wireless device reachability.

17. The apparatus of claim 16, wherein the instructions, when executed by the one or more processors, further cause the SMF to send the downlink data to the wireless device via the AMF.

18. The apparatus of claim 11, wherein the instructions, when executed by the one or more processors, further cause the SMF to determine a second data buffer expiration time parameter based on the extended buffering time.

19. The apparatus of claim 18, wherein the instructions, when executed by the one or more processors, further cause the SMF to retain the second data buffer expiration time parameter.

20. A system, comprising:
    a wireless device; and
    an apparatus, comprising:
      one or more processors; and
      memory storing instructions that, when executed by the one or more processors, cause a session management function (SMF) to:
        send, to an access and mobility management function (AMF), a first message for user plane activation of the wireless device, the first message comprising an identifier of a packet data unit session of the wireless device;
receive, from the AMF and in response to the wireless device being unreachable, a second message to determine an extended buffering time; and
send, to a user plane function (UPF), a third message comprising the extended buffering time and indicating to buffer downlink data of the wireless device.

* * * * *

UNITED STATES PATENT AND TRADEMARK OFFICE
CERTIFICATE OF CORRECTION

Page 1 of 1

PATENT NO. : 11,765,631 B2
APPLICATION NO. : 17/208190
DATED : September 19, 2023
INVENTOR(S) : Peyman Talebi Fard et al.

It is certified that error appears in the above-identified patent and that said Letters Patent is hereby corrected as shown below:

On the Title Page

Item (71) Applicant: "Honor Device Co., Ltd., Guangdong (CN)" should read "Honor Device Co., Ltd., Shenzhen (CN)"

Signed and Sealed this
Fourteenth Day of November, 2023

Katherine Kelly Vidal
*Director of the United States Patent and Trademark Office*